United States Patent Office 3,751,485
Patented Aug. 7, 1973

3,751,485
MODIFIED PHENOLIC STILBENES AS
ANTIFERTILITY AGENTS
William J. Middleton, Chadds Ford, Pa., assignor to E. I. du Pont de Nemours and Company, Wilmington, Del.
No Drawing. Original application Oct. 31, 1969, Ser. No. 873,124. Divided and this application Nov. 15, 1971, Ser. No. 198,952
Int. Cl. C07c 43/28
U.S. Cl. 260—612 R                4 Claims

ABSTRACT OF THE DISCLOSURE

Described are certain 1,1-bis(trifluoromethyl)-2,2-diphenylethylenes, which carry an oxy group in the para position of at least one benzene ring. These new compounds, as well as their parent compound, 1,1-bis(trifluoromethyl)-2,2-diphenylethylene, are effective in preventing pregnancy in warm-blooded animals and can be administered after coitus.

RELATED APPLICATION

This application is a division of my copending application Ser. No. 873,124 filed Oct. 31, 1969 and now Pat. No. 3,678,117.

BACKGROUND OF THE INVENTION

This invention relates to novel 1,1-bis(trifluoromethyl)-2,2-diphenylethylenes, wherein the para position of at least one benzene ring has an oxy group. This invention further relates to the use of these compounds in the prevention of pregnancy.

At present, there are widely used antifertility agents which act to establish a pseudopregnant condition in the female and thereby prevent ovulation. In general, they are mixtures of estrogens and progestins, and they must be taken daily during a major portion of the menstrual cycle. Unfortunately, administration of these mixtures can result in side effects similar to those commonly occurring during early pregnancy.

There is a need, however, for antifertility agents which can be administered after coitus and which do not have the undesirable pseudopregnancy side effects.

SUMMARY OF THE INVENTION

Now, according to this invention, it has been discovered that certain new 1,1-bis(trifluoromethyl)-2,2-diphenylethylenes are effective antifertility agents for warm-blooded female animals when administered after coitus. It is probable that the mechanism of action is such that nidation is prevented. Compounds of this invention are easy to use and do not cause pseudopregnancy side effects.

The novel compounds are 1,1-bis(trifluoromethyl)-2,2-diphenylethylenes (alternatively named 3,3,3-trifluoro-1,1-diphenyl-2-trifluoromethylpropenes) having the formula

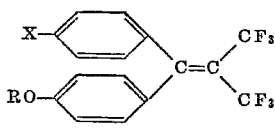

in which X is H or OR; R being hydrogen, alkyl, hydroxyalkyl, aliphatic secondary aminoalkyl (including heterocyclic amine derivatives such as morpholinoalkyl, piperidinoalkyl and pyrrolidinoalkyl) or an acyl group derived from an alkanoic, cycloalkanoic, cycloalkenoic, hydroxyalkanoic, dialkylaminoalkanoic or aromatic acid; the total carbon content of each R substituent not exceeding 12 carbon atoms.

DETAILED DESCRIPTION OF THE INVENTION

Representative R groups which are contemplated by this invention are: methyl, ethyl, butyl, hexyl, octyl and dodecyl, including both straight chain and branched radicals; hydroxyethyl, hydroxypropyl, hydroxyhexyl, hydroxynonyl, dimethylaminomethyl, dimethylaminoethyl, diethylaminoethyl, dipropylaminobutyl, dibutylaminohexyl, N-morpholinoethyl, N-piperidinopropyl, N-pyrrolidinomethyl, formyl, acetyl, propionyl, cyclohexanonyl, decanoyl, lactoyl, salicyl, diethylaminoacetyl dimethylaminobutyryl, benzoyl, 1-naphthoyl and 4-toluyl. The preferred compounds of this invention are those in which at least one of the R groups is hydrogen, a $C_1$-$C_3$ alkyl group, or a $C_1$-$C_3$ acyl group.

The diphenylethylenes in which X is hydrogen and R is alkyl can be prepared by the reaction of 1,1-bis(trifluoromethyl)-2-fluoro-2-phenylethylene with a p-alkoxyphenyllithium, as illustrated by the following equation.

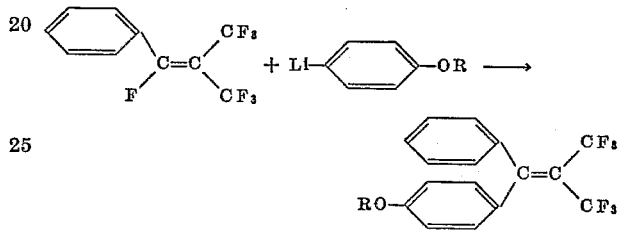

The diphenylethylene in which R is H can be prepared similarly by the reaction of 1,1-bis(trifluoromethyl)-2-fluoro-2-phenylethylene with the lithium salt of p-hydroxyphenyllithium, followed by acidification, as illustrated by the following equation.

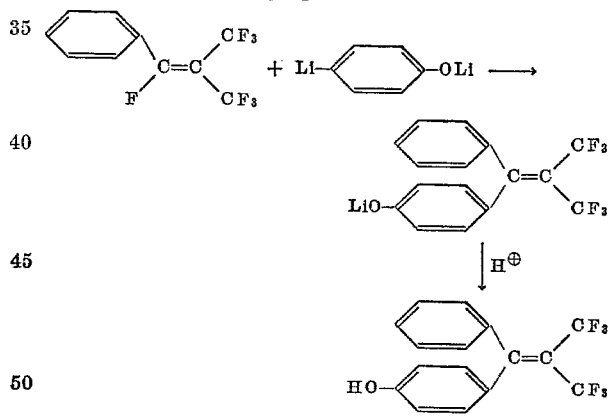

The diphenylethylenes in which both phenyl rings contain identical OR groups, with R being either hydrogen or alkyl, can be prepared by the reaction of one equivalent of perfluoroisobutylene with two equivalents of p-alkoxyphenyllithium as illustrated by the following equation:

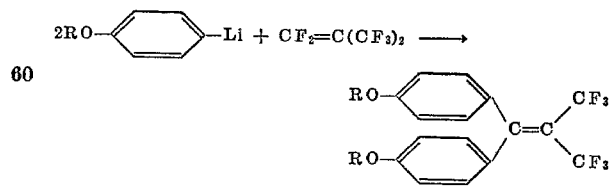

or with two equivalents of the lithium salt of p-hydroxyphenyllithium.

The diphenylethylenes in which the two phenyl rings contain non-identical OR groups can be prepared by the reaction of a 1,1-bis(trifluoromethyl)-2-fluoro-2-p-alkoxyphenylethylene with a phenyllithium containing a different p-alkoxy group.

The 1,1-bis(trifluoromethyl)-2-fluoro-2-phenylethylenes used in these procedures can be prepared by the reaction of phenylmagnesium halide or p-alkoxyphenylmagnesium halide with perfluoroisobutylene, which is a well known compound described, i.e., in U.S. 2,617,836.

All of these reactions between the fluoroolefins and lithium compounds are conducted in the presence of an inert solvent such as diethyl ether or an aliphatic or aromatic hydrocarbon. The optimum reaction temperature is between −80° and +40° C., and the optimum pressure is between ½ and 3 atmospheres, the atmospheric pressure being the most convenient to employ. The products of the reaction can be isolated and purified by conventional techniques such as distillation, recrystallization, and chromatography.

The diphenylethylenes of this invention in which R is alkyl can also be made by first contacting hexafluorothioacetone with a p-alkoxy or a p,p'-dialkoxydiphenyldiazomethane in an inert hydrocarbon, chlorohydrocarbon, or ether solvent at a temperature between −80° and +40° C. to form an episulfide which next is thermally desulfurized at temperatures of about 100–250° C., as illustrated by the following equation.

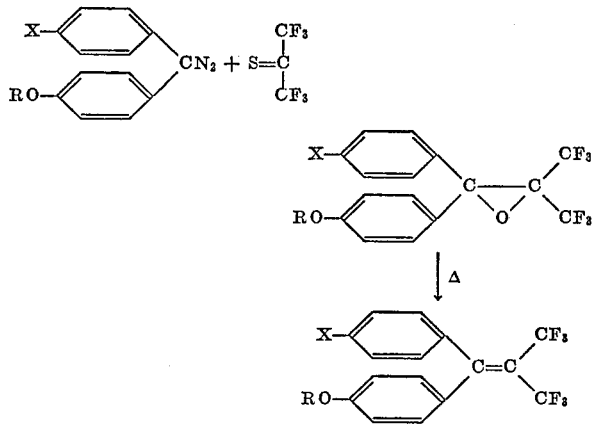

The diphenylethylenes in which R groups are acyloxy can be prepared by heating the corresponding hydroxy diphenylethylenes with acyl anhydrides or acyl halides.

An alternative route for preparing the alkoxydiphenylethylenes is by alkylation of the hydroxydiphenylethylenes with alkylating agents such as an alkyl sulfate or an alkyl halide in the presence of an acid acceptor, such as sodium carbonate or sodium hydroxide.

The following examples illustrate the preparation of the new compounds of the present invention.

EXAMPLE 1

1,1-bis(trifluoromethyl)-2-phenyl-2-(4-hydroxyphenyl)ethylene

X=R=H

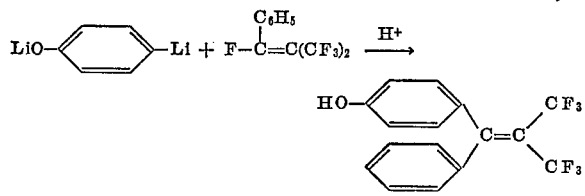

A solution of 13.84 g. (0.08 mole) of p-bromophenol in 100 ml. of ether was added dropwise to 0.16 mole of butyllithium in 200 ml. of 50/50 ether-hexane. The reaction mixture was stirred for 1 hour at room temperature, and then a solution of 20.8 g. (0.08 mole) of 1-fluoro-2,2-bis(trifluoromethyl)-1-phenylethylene in 25 ml. of ether was added dropwise over 15 min. The reaction mixture was stirred for 1 hour, then mixed with 200 ml. of 10% HCl. The ether layer was washed with water, dried (MgSO₄) and distilled to give 7.1 g. of a colorless liquid, B.P. 121–125° (0.2 mm.) that solidified on cooling. Recrystallization from pentane gave 6.5 g. of 1,1-bis(trifluoromethyl)-2-phenyl-2-(4 - hydroxyphenyl)-ethylene as colorless needles: M.P. 105–106° C.; F¹⁹ NMR (acetone) δ 54.7 (m, A₃B₃); IR (KBr) 2.99μ (OH); UV (ethanol) λmax 306 mμ (ε 9,900), 275 (ε 10,200) and 232 (ε 13,700).

*Analysis.*—Calcd. for C₁₆H₁₀F₆O (percent): C, 57.84; H, 3.03; F, 34.32. Found (percent): C, 57.97; H, 3.15; F, 34.21.

The 1-fluoro-2,2-bis(trifluoromethyl)-1-phenylethylene used in this example was prepared in the following manner:

Perfluoroisobutylene (68 ml. measured at −78° C., 0.6 mole) was slowly distilled over a period of 1.5 hours into a solution of 0.66 mole of commercial phenylmagnesium bromide in ether (440 ml.) cooled to 5–10° C. Aqueous 10% hydrochloric acid, 250 ml., was added, the organic layer separated, washed with water, and dried (MgSO₄). Distillation gave 103 g. (67%) of 1-fluoro-2,2-bis(trifluoromethyl)-1-phenylethane as a colorless liquid: B.P. 84–85° C. (50 mm.); $n_D^{25}$ 1.4179; IR (liquid) 5.98μ (C=C); UV (EtOH)

$\lambda_{max}^{243}$. mμ

(ε 10,800); F¹⁹ NMR (neat) δ 56.6 p.p.m. (d, 10 Hz. to quartet, 8 Hz., eF), 59.0 p.p.m. (d, 24 Hz., to quartet, 8 Hz., eF), 64.5 p.p.m. (quartet, 24 Hz. to quartet, 10 Hz., 1F).

*Analysis.*—Calcd. for C₁₀H₅F₇ (percent): C, 46.54; H, 1.95; F, 51.52. Found (percent): C, 46.60; H, 2.18; F, 51.66.

EXAMPLE 2

1,-bis(trifluoromethyl)-2-phenyl-2-(4-acetoxyphenyl)ethylene
X=H, R=acetyl

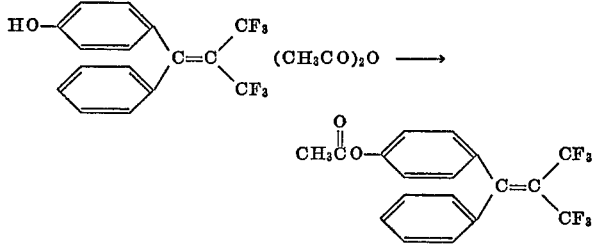

A solution of 2.5 g. of 1,1-bis(trifluoromethyl)-2-phenyl-2-(4-hydroxyphenyl)ethylene in 10 ml. of acetic anhydride was heated at reflux for 2 hours. Water, 50 ml., was added to decompose the excess anhydride, and the solid that separated was collected on a filter, washed with water, and recrystallized from pentane. There was obtained 2.3 g. of 1,1-bis(trifluoromethyl)-2-phenyl-2-(4-acetoxyphenyl)ethylene as colorless crystals; M.P. 84–86° C.; F¹⁹ NMR (CCl₃F) δ 55.7 p.p.m. (s); H' NMR (CCl₃F) τ 2.6–3.0 (m, 9H) and τ 7.89 (m, CH₃); IR (KBr) 5.62μ (C=O); UV (ethanol) λmax 262 mμ (ε 10,600) and 221 (ε 14,600).

*Analysis.*—Calcd. for C₁₈H₁₂F₆O₂ (percent): C, 57.76; H, 3.23; F, 30.46. Found (percent): C, 57.50; H, 3.49; F, 30.52.

EXAMPLE 3

1,1-bis(trifluoromethyl)-2,2-di-(4-ethoxyphenyl)ethylene

X=OR, R=ethyl

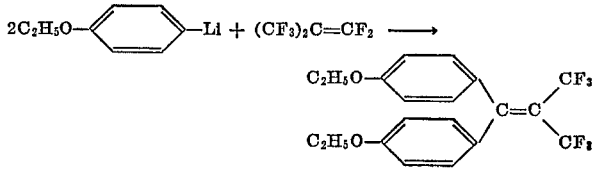

An 80.4 g. sample (0.4 mole) of p-bromophenetole was added dropwise to a solution of 0.4 mole butyllithium in 500 ml. of 50/50 ether-hexane. The reaction mixture was stirred at room temperature for 1 hour, and then cooled in an ice bath. Perfluoroisobutylene, 25 ml. measured at −78° C. was slowly distilled into the reaction mixture over a period of 30 minutes. Aqueous 10% hydrochloric acid, 200 ml., was added and the organic layer was separated, washed with water, dried (MgSO$_4$), and distilled to give 40 g. of a colorless liquid, B.P. 148–158° C. (0.2 mm.) that solidified upon cooling. Recrystallization from pentane gave 30.1 g. of 1,1-bis (trifluoromethyl)-2,2-di(4-ethoxyphenyl)ethylene as colorless crystals: M.P. 71–73° C.; F$^{19}$ NMR (CCl$_3$F) δ 55.3 p.p.m. (s); H′ NMR CCl$_3$F) τ 3.13 (m, A$_2$B$_2$, 8H), τ 6.05 (quartet, J=7 Hz., 4H) and τ 8.65 (t, J=7 Hz., 6H); UV (ethanol) λ$_{max}$ 300 mμ (ε 18,600) and 229 mμ (ε 18,300).

Analysis.—Calcd. for C$_{20}$H$_{18}$F$_6$O$_2$ (percent): C, 59.41; H, 4.49; F, 28.19. Found (percent): C, 59.48; H, 4.62; F, 28.12.

EXAMPLE 4

1,1-bis(trifluoromethyl)-2,2-di(4-methoxyphenyl) ethylene

X=OR, R=methyl

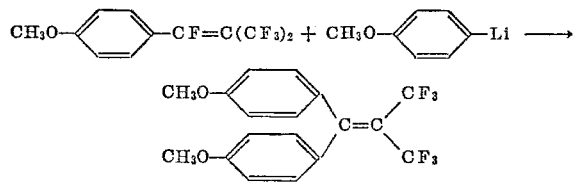

4-bromoanisole, 20.6 g. (0.11 mole) was added dropwise over 20 min. to 0.1 mole of butyllithium in 60 ml. of hexane solution, and the reaction mixture was stirred for 30 min. A 50 ml. portion of ether was added to bring the precipitated solids into solution, and then 23 g. (0.08 mole) of 1 - fluoro - 2,2-bis(trifluoromethyl)-1-(4-methoxyphenyl)ethylene was added dropwise over 30 min. Cooling was maintained to keep the temperature between 25–40° C. Aqueous 10% hydrochloric acid, 100 ml., was added and the organic layer was separated, washed with water, and dried (MgSO$_4$). Distillation gave 16.5 g. (55%) of 1,1 - bis(trifluoromethyl) - 2,2-di(4-methoxyphenyl)ethylene as a viscous liquid, B.P. 130–134° C. (0.06 mm.), that crystallized in pentane to give colorless needles:

M.P. 77–78°; F$^{19}$ NMR (CCl$_3$F) δ 55.3 p.p.m. (s); H$^1$ NMR (CCl$_3$F) τ 6.28 (s, 6H) and τ 3.07 (m, 8H); and UV (EtOH) λ$_{max}$ 229 mμ (ε 18,300), 229 mμ (ε 17,000).

Analysis.—Calcd. for C$_{18}$H$_{14}$F$_6$O$_2$ (percent): C, 57.45; H, 3.75; F, 30.30. Found (percent): C, 57.66; H, 3.66; F, 30.25.

Deep purple solutions are formed when this material is dissolved in strong acids such as trifluoroacetic acid or 60% sulfuric acid. The spectral evidence of a solution in 98% sulfuric acid indicates that a stable carbonium ion is formed:

F$^{19}$ NMR (98% H$_2$SO$_4$) δ 59.7 p.p.m. (d, J=7.7 Hz.); UV (98% H$_2$SO$_4$) 545 mμ (ε 40,200), 345 mμ (ε 9,580) and mμ (ε 8,000).

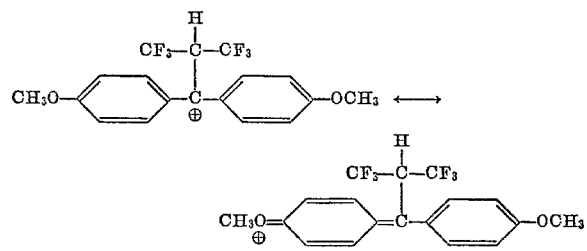

The 1 - fluoro-2,2-bis(trifluoromethyl)-1-(4-methoxyphenyl) ethylene used in this example was prepared in the following manner:

A 56.12 g. sample (0.3 mole) of p-bromoanisole was added dropwise to 8.00 g. (0.33 mole) of magnesium turnings in 500 ml. of ether. Grignard formation was complete in about 2 hours. The solution was cooled to 15–20° C. 34 ml. (ca. 0.3 mole) of perfluoroisobutylene was distilled into the solution over a period of 30 min., and then 200 ml. of aqueous 10% hydrochloric acid was added. The ether layer was separated, washed with water, dried (MgSO$_4$), and then distilled. There was obtained 56.5 g. (65%) of 1 - fluoro-2,2-bis(trifluoromethyl)-1-(4-methoxyphenyl)ethylene as a colorless liquid: B.P. 81–82° C. (5.2 mm.); n$_D^{25}$ 1.4534; 1r (liquid) 6.18μ (C=CF); UV (EtOH) λ$_{max}$ 282 mμ (ε 14,900), 218 mμ (ε 9,730); F$^{18}$ NMR (neat) δ 56.4 (quartet J=8.5 Hz. to d, J=10 Hz., 3F), 58.7 (quartet J=8.5 Hz. to d, J=24 Hz, 3F), 64.9 (m, 1F).

Analysis.—Calcd. for C$_{11}$H$_7$F$_2$O (percent): C, 45.85; H, 2.45; F, 46.15. Found (percent): C, 46.15; H, 2.50; F, 46.42.

EXAMPLE 5

1,1-bis(trifluoromethyl)-2(4-methoxyphenyl)-2-phenylethylene

X=H, R=methyl (a)

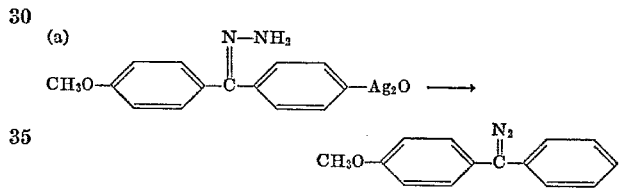

A solution of 22.6 g. (0.1 mole) of 4-methoxybenzophenone hydrazone in 100 ml. of methylene chloride was added dropwise over a period of one hour to a stirred suspension of 23.2 g. (0.1 mole) of silver oxide in 50 ml. of methylene chloride cooled in an ice bath. The reaction mixture was stirred for 2 hours, 20 g. of magnesium sulfate was added, and the stirring was continued for 20 minutes. Filtration gave a dark purple solution of the diazo compound.

(b)

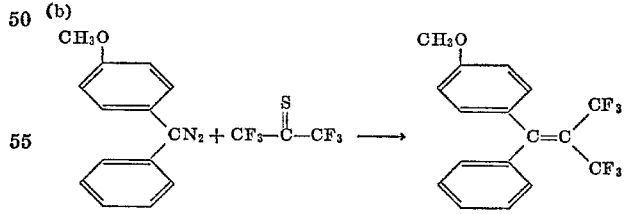

Hexafluorothioacetone was added portionwise to this solution of phenyl-4-methoxyphenyldiazomethane in methylene chloride cooled to −30° C. until the purple solution faded to yellow. The solvent was removed by evaporation, and the residue was redissolved in pentane. The pentane solution was filtered to remove the sulfur, and the filtrate was distilled. There was obtained 7.2 g. of 1,1 - bis(trifluoromethyl) - 2 - (4-methoxyphenyl)-2-ethylene as a nearly colorless liquid, B.P. 102–103° C. (0.2 mm.), n$_D^{25}$1.5266. The F$^{19}$ NMR (CClF$_3$) showed a multiplet (87% integrated area) at 55.4 p.p.m. from CClF$_3$, and absorptions (13% total) due to impurities at 61.1, 64.6, and 64.8 p.p.m.

Analysis.—Calcd. for C$_{17}$H$_{12}$F$_6$O (percent): C, 58.96; H, 3.50; F, 32.92. Found (percent): C, 60.04; H, 3.87; F, 30.08.

EXAMPLE 6

1,1-bis(trifluoromethyl)-2-phenyl-2-[4-(β-diethylamino)ethoxyphenyl]-ethylene citrate X=H, R=diethylaminoethyl

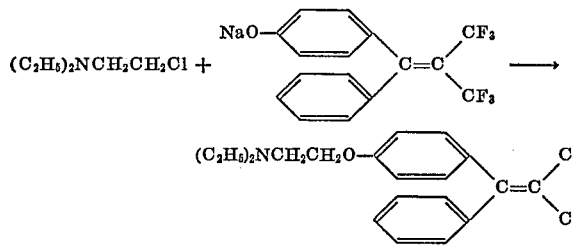

A 0.85 g. sample (0.007 mole) of β-chlorotriethylamine was added to a solution of 1.66 g. (0.005 mole) of 1,1-bis(trifluoromethyl)-1-phenyl-1 - (4 - hydroxyphenyl)ethylene in aqueous 5% sodium hydroxide. The oil that precipitated was collected in 75 ml. of ether, and the ether extract was dried over sodium hydroxide pellets and then mixed with a solution of 1.1 g. (0.005 mole) of citric acid in 200 ml. of wet ether. The precipitate that formed was collected on a filter, washed with ether, and dried in air to give 1.6 g. of a white powder. Recrystallization from acetone gave 1.1 g. of 1,1-bis(trifluoromethyl)-2-phenyl-2-[4-(β - diethylamino)ethoxyphenyl]ethylene citrate as colorless crystals; M.P. 134–136° C.; $F^{19}$ NMR (acetone-d6) δ 54.1 p.p.m. (multiplet, $CF_3$).

Analysis.—Calcd. for $C_{28}H_{31}F_6NO_8$ (percent): C, 53.93; H, 5.01; N, 2.25. Found (percent): C, 52.28; H, 5.03; N, 2.46.

Additional examples of preferred routes to other diphenylethylenes of this invention are listed in the following Table I.

TABLE I

| Reactants | Product |
|---|---|
| $CH_3O$-C₆H₄-C(F)(C₆H₅)=C(CF_3)_2$ + LiO-C₆H₄-Li →$H^{\oplus}$ | 1,1-bis(trifluoromethyl)-2-(p-hydroxyphenyl)-2-(p-methoxyphenyl)ethylene |
| $CH_3O/HO$-diaryl ethylene + $(CH_3CO)_2O$ → | 1,1-bis(trifluoromethyl)-2-(p-methoxyphenyl)-2-(p-acetoxyphenyl)ethylene |
| $CH_3O/HO$-diaryl ethylene + $ClCH_2CH_2$-N(pyrrolidine) → | 1,1-bis(trifluoromethyl)-2-(p-methoxyphenyl)-2-(p-2-pyrrolidinoethoxyphenyl)ethylene |
| $CF_2=C(CF_3)_2$ + 2LiO-C₆H₄-Li →$H_+$ | 1,1-bis(trifluoromethyl)-2,2-bis(p-hydroxyphenyl)ethylene |
| HO/HO-diaryl ethylene + $(CH_3CO)_2O$ → | 1,1-bis(trifluoromethyl)-2,2-bis(p-acetoxyphenyl)ethylene |
| Ph/HO-diaryl ethylene + PhCOCl → | 1,1-bis(trifluoromethyl)-2-phenyl-2-(p-benzoyloxyphenyl)ethylene |
| Ph/HO-diaryl ethylene + adamantoyl COCl → | 1,1-bis(trifluoromethyl)-2-phenyl-2-(p-1-adamantoyloxyphenyl)ethylene |
| $CH_3O/HO$-diaryl ethylene + $ClCH_2CH_2$N(piperidine) → | 1,1-bis(trifluoromethyl)-2-(p-methoxyphenyl)-2-(p-2-piperidinoethoxyphenyl)ethylene |

TABLE I—Continued

| Reactants | Product |
|---|---|
| 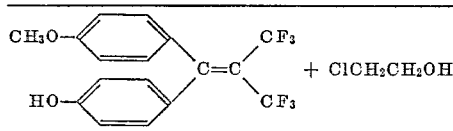 + ClCH₂CH₂OH → | 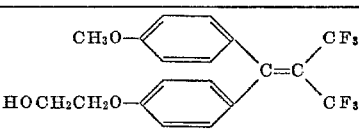 |
| 1,1-bis(trifluoromethyl)-2-(p-methoxyphenyl)-2-(p-2-hydroxyethoxyphenyl)ethylene | |
| 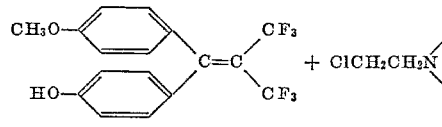 + ClCH₂CH₂N⟨O⟩ → | 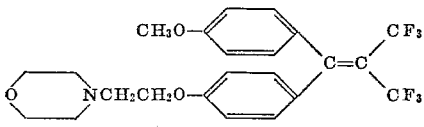 |
| 1,1-bis(trifluoromethyl)-2-(p-methoxyphenyl)-2-(p-2-morpholinoethoxyphenyl)ethylene | |
| 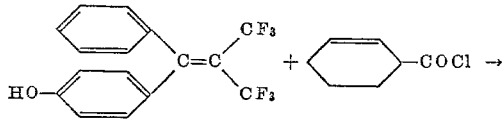 + ⟨⟩—COCl → | 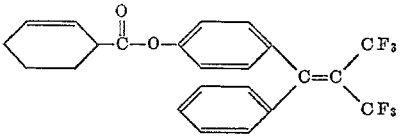 |
| 1,1-bis(trifluoromethyl)-2-phenyl-2-(p-2-cyclohexenylcarbonyloxyphenyl)ethylene | |
| 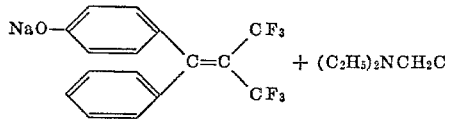 + (C₂H₅)₂NCH₂COOH → | 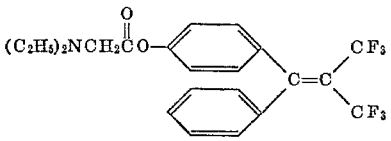 |
| 1,1-bis(trifluoromethyl)-2-phenyl-2-(p-diethylaminoacetoxyphenyl)ethylene. | |

The new compounds of this invention, as well as their parent compound, 1,1,1-bis(trifluoromethyl)-2,2-diphenylethylene, are useful in prevention of pregnancy in warm-blooded animals. The compounds can be administered by any suitable means. Oral administration is preferred. Administration also can be parenteral, that is subcutaneous or intramuscular, or rectal. The compounds are preferably administered in a single dose, preferably orally, after coitus, but before implantation of the fertilized egg. Alternatively, single or divided doses can be administered daily during all or a substantial fraction of the estrous cycle or menstrual cycle.

Doses will ordinarily range from about 0.0005 to about 50 milligrams per kilogram of body weight of the recipient per day (mg./kg.-day). The preferred dosage range is from about 0.0025 to about 10 mg./kg.-day, and the most preferred range is from about 0.005 to about 5 mg./kg.-day.

These compounds can be employed with satisfactory results to prevent pregnancy in laboratory animals such as rats, mice, guinea pigs, rabbits, monkeys and chimpanzees and are also effective in preventing pregnancy in domestic animals such as swine, cows, sheep and horses. In small animals it is usually convenient to administer them in the form of a capsule, or incorporate them in the animal feed. For large animals, parenteral administration is often preferred.

These compounds can be employed in useful compositions in such dosage forms as tablets, capsules, powder packets, or liquid solutions, suspensions, or elixirs for oral administration or liquid solutions for parenteral use, and in certain cases, suspensions for parenteral use. In such compositions, the active ingredient will ordinarily always be present in the amount of at least 0.01% by weight based on the total weight of the composition and not more than 90% by weight.

Besides the active 1,1 - bis(trifluoromethyl) - 2,2 - diphenylethylenes, the composition will contain a solid or liquid non-toxic pharmaceutical carrier for the active ingredient.

In one embodiment of a pharmaceutical composition of this invention, the solid carrier is a capsule which can be of the ordinary gelatin type. The capsule will contain from about 0.03–75% by weight of the active compound and 99.97–25% of a carrier.

In another embodiment, the active ingredient is tableted with or without adjuvants. In yet another embodiment, the active ingredient is put into powder packets. These capsules, tablets and powders will usually contain about 0.03% to 95% and preferably 0.1% to 70% by weight of active ingredient. These dosage forms preferably contain about 0.1 to 700 milligrams of active ingredient, a quantity of about 0.03 milligram to 350 milligrams being most preferred.

The pharmaceutical carrier can be a sterile liquid such as water and oils, including those of petroleum, animal, vegetable or synthetic origin, for example, peanut oil, soybean oil, mineral oil, sesame oil, and the like. In general, water, saline, aqueous dextrose (glucose) and related sugar solutions, and glycols such as propylene glycol or polyethylene glycols are preferred liquid carriers, particularly for injectable solutions. Sterile injectable solutions, such as saline, will ordinarily contain about 0.0035% to 25%, and preferably about 0.01% to 5% by weight of the active ingredient.

Suitable formulations for oral administration can be prepared in a suspension, syrup or elixir in which the active ingredient ordinarily will constitute about 0.0007 to 5% and preferably about 0.003 to 1% by weight. The pharmaceutical carrier in such composition can be an aqueous vehicle such as an aromatic water, a syrup or a pharmaceutical mucilage.

Suitable pharmaceutical carriers are described in "Remington's Pharmaceutical Sciences" by E. W. Martin, a well-known reference text in this field.

The following examples further illustrtae the fertility control in warm-blooded animals by the process of the present invention.

EXAMPLE A

Immature female rats (28 days old) are induced into precocious puberty with a single dose of pregnant mare's serum gonadotrophin and then are mated with normal males. 1,1-bis(trifluoromethyl)-2,2-di(4-methoxyphenyl)-ethylene (the product of Example 4) suspended in sesame oil is orally administered in graded doses to numerically equal groups of these female rats for six days starting on the day of finding sperm or a vaginal plug. One week after mating, the animals are killed and their uteri are examined for implantation sites. If any are found, the animal is considered pregnant. Control animals have a mean of eight implantation sites. The dose level at which 50% of the animals show no evidence of pregnancy, the $ED_{50}$, is 0.08 mg./kg.-day.

The general procedure of the preceding example is repeated with other bis(trifluoromethyl)diphenylethylenes. Table II summarizes these experiments.

TABLE II

| Compound of example: | $ED_{50}$ in mg./kg.-day |
|---|---|
| 1 | 0.0195–0.078 |
| 2 | 0.078–0.31 |
| 3 | 0.020–0.078 |
| 5 | 0.016 |

When the parent compound, 1,1-bis(trifluoromethyl)-2,2-diphenylethylene, was used in a similar experiment, it had an activity at $ED_{50}$ of 0.11 mg./kg.-day. 1,1-bis(trifluoromethyl)-2,2-diphenylethylene is a known compound, cf. W. J. Middleton and W. H. Sharkey, J. Org. Chem., 30, 1384 (1965).

The embodiments of the invention in which an exclusive property or privilege is claimed are defined as follows:

1. A compound of the formula

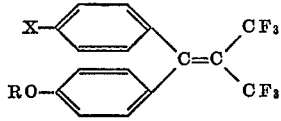

in which X is selected from H and OR; and R is selected from alkyl and hydroxyalkyl; each R having up to twelve carbon atoms.

2. 1,1-bis(trifluoromethyl) - 2,2 - di(4 - ethoxyphenyl)-ethylene, the compound of claim 1 in which X is OR and R is ethyl.

3. 1,1-bis(trifluoromethyl) - 2,2 - di(4 - methoxyphenyl)-ethylene, the compound of claim 1 in which X is OR and R is methyl.

4. 1,1-bis(trifluoromethyl) - 2 - (4 - methoxyphenyl)-2-phenylethylene, the compound of claim 1 in which X is H and R is methyl.

References Cited

UNITED STATES PATENTS

| 3,237,200 | 2/1966 | Barany et al. | 260—619 A |
| 3,683,009 | 8/1972 | Middleton | 260—612 R |

OTHER REFERENCES

Dixon, Jour. Org. Chem., vol. 21 (1956), pp. 400–403.

Miguel et al., Jour. Med. Chem., vol. 6 (1963), pp. 774–780.

Middleton et al., Jour. Org. Chem., vol. 30 (1965), pp. 1384–1389.

BERNARD HELFIN, Primary Examiner

U.S. Cl. X.R.

260—613 R

UNITED STATES PATENT OFFICE
CERTIFICATE OF CORRECTION

Patent No. 3,751,485        Dated August 7, 1973

Inventor(s) William John Middleton

It is certified that error appears in the above-identified patent and that said Letters Patent are hereby corrected as shown below:

Col. 3, line 30, the formula should be:

-- 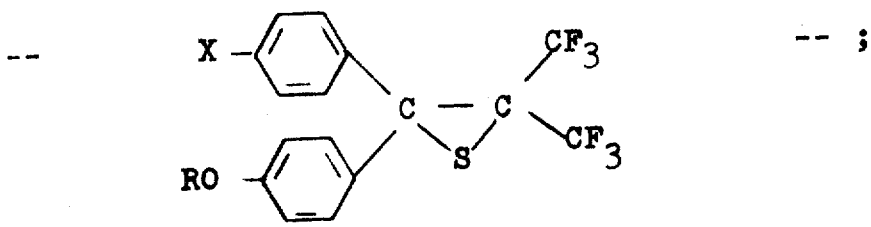 -- ;

Col. 4, line 35, should be -- 1,1-bis(trifluoromethyl)-2-phenyl-2 --;

Col. 2, line 9, correct the spelling of "cyclohexanoyl".

Signed and sealed this 8th day of October 1974.

(SEAL)
Attest:

McCOY M. GIBSON JR.
Attesting Officer

C. MARSHALL DANN
Commissioner of Patents